US012601611B2

(12) United States Patent　　(10) Patent No.: US 12,601,611 B2
Lallemand　　(45) Date of Patent: Apr. 14, 2026

(54) POSITION-INDICATING DEVICE FOR A SUPPORT ELEMENT

(71) Applicant: LISEGA SE, Zeven (DE)

(72) Inventor: Hervé Lallemand, Bevres (FR)

(73) Assignee: LISEGA SE, Zeven (DE)

( * ) Notice: Subject to any disclaimer, the term of this patent is extended or adjusted under 35 U.S.C. 154(b) by 597 days.

(21) Appl. No.: 18/002,309

(22) PCT Filed: Feb. 18, 2021

(86) PCT No.: PCT/EP2021/053994
§ 371 (c)(1),
(2) Date: Dec. 19, 2022

(87) PCT Pub. No.: WO2021/254666
PCT Pub. Date: Dec. 23, 2021

(65) Prior Publication Data
US 2023/0349727 A1　　Nov. 2, 2023

(30) Foreign Application Priority Data

Jun. 19, 2020　(DE) ..................... 10 2020 116 261.8

(51) Int. Cl.
*G01D 5/02*　(2006.01)
(52) U.S. Cl.
CPC ...................................... *G01D 5/02* (2013.01)
(58) Field of Classification Search
CPC ... G01D 5/02; G01D 1/12; G01B 5/02; G01B 5/043; F16C 2361/53; B60G 15/04
(Continued)

(56) References Cited

U.S. PATENT DOCUMENTS 5,018,607 A * 5/1991 Hardtke .................. F16K 17/04
188/282.8
10,060,809 B1 * 8/2018 Hoffman ............. G01M 99/007
(Continued)

FOREIGN PATENT DOCUMENTS

CN　　2147520 Y　* 11/1993
DE　　2737097　　3/1979
(Continued)

OTHER PUBLICATIONS

GB2327757A foreign reference (Year: 1998).*
(Continued)

*Primary Examiner* — Kristina M Deherrera
*Assistant Examiner* — Evan Mancini
(74) *Attorney, Agent, or Firm* — Grossman, Tucker, Perreault & Pfleger, PLLC

(57) ABSTRACT

A position-indicating device for indicating the movement of a portion of a support element which is movable relative to a fixed portion, the support element being, more particularly, a spring hanger or constant hanger, a snubber, a vibration damper and/or an articulated-connection strut, the position-indicating device comprising: a mechanical movement-transmitting apparatus for transmitting the movement of the movable portion of the support element; an indicating apparatus for coupling to the movement-transmitting apparatus and for indicating the movement of the movable portion of the support element, wherein the indicating apparatus has a hollow cylinder and a driver element, which is movably mounted in the hollow cylinder and is coupled to the movement-transmitting apparatus with respect to movement, and wherein the hollow cylinder comprises a longitudinal slot, in which a transverse pin running radially outward extends, the transverse pin being moved along with driver element and being designed to move at least one (Continued)

extreme-value indicator, which extreme-value indicator is disposed radially outside with respect to the hollow cylinder. A support apparatus coupled to a position-indicating device of this type with respect to movement.

20 Claims, 3 Drawing Sheets

(58) Field of Classification Search
USPC ........ 116/272–273, 277, 280–283, 306, 321; 137/551
See application file for complete search history.

(56) References Cited

U.S. PATENT DOCUMENTS

| | | | | |
|---|---|---|---|---|
| 2002/0070054 A1 * | 6/2002 | Strohmeier | .............. | G01G 3/02 177/232 |
| 2018/0199799 A1 * | 7/2018 | Chu | ..................... | A61B 1/0052 |

FOREIGN PATENT DOCUMENTS

| | | | | | |
|---|---|---|---|---|---|
| EP | 0342405 | | 11/1989 | | |
| EP | 1724492 | | 11/2006 | | |
| EP | 3290737 | | 3/2018 | | |
| GB | 2327757 A | * | 2/1999 | .............. | F15B 15/28 |
| JP | 5714803 | | 1/1982 | | |
| JP | 60-100008 | | 6/1985 | | |
| JP | S60100008 A | * | 6/1985 | | |
| JP | 2-11987 | | 1/1990 | | |
| JP | 2009-509105 | | 3/2009 | | |
| JP | 2010-513814 | | 4/2010 | | |
| JP | 2012-211705 | | 11/2012 | | |
| WO | 99/06790 | | 2/1999 | | |

OTHER PUBLICATIONS

Artikel. "Produkt Datenblatt", Dec. 12, 2018, pp. 1-1, Retrieved from the Internet: https ://www.pesola.com/data/media/images/cms/Produktdatenblatt-Federwaage-Macro-Linie-80005.pdf, retrieved on Apr. 16, 2021. No English translation available, however, concise explanation of relevancy can be found on the International Search Report submitted herewith.

"https://web.archive.org/web/20181212111643/https://www .pesola.com/", Dec. 12, 2018, Retrieved from the Internet: https:/ /web.archive.org/web/20181212111643/https://www.pesola.com/, retrieved on Apr. 16, 2021. No English translation available, however, concise explanation of relevancy can be found on the International Search Report submitted herewith.

Product data sheet "Spring balance Macro Line 8005" of the company Pesola®, https://www.pesola.com, retrieved on May 11, 2021. No English translation available, however, concise explanation of relevancy can be found on pp. 1-2 of the substitute specification filed herewith.

English translation of the International Search Report from corresponding PCT Appln. No. PCT/EP2021/053994, dated Mary 6, 2021.

International Preliminary Report on Patentability from corresponding PCT Appln. No. PCT/EP2021/053994, dated Dec. 22, 2022.

English translation of Office Action from related Japanese Appln. No. 2022-578575, dated Mar. 12, 2024.

English translation of Office Action from related Saudi Arabian Appln. No. 522441799, dated Feb. 25, 2024.

* cited by examiner

POSITION-INDICATING DEVICE FOR A SUPPORT ELEMENT

FIELD

The invention relates to a position-indicating device for indicating the movement of a portion of a support element which is movable relative to a fixed portion, the support element being, more particularly, a spring or constant hanger, a snubber, a vibration damper. Spring or constant hangers are used to support the weight of pipelines, tanks and other parts of a system, vibration dampers are used to reduce vibrations that occur, snubbers are used to protect systems against earthquakes, water hammers, pipe ruptures or pressure surges in piping systems, without hindering the slow, especially thermally induced, movements of the components to be protected.

BACKGROUND

In some cases, standards require such conventional support elements to have a displacement or position indicator which indicates the current position of a movable portion of the support element. Depending on the application or installation position of the support element, the possibility of a user to read the position indicator may be limited, for example in the area of nuclear, chemical or other potentially explosive installations. In addition, when using support elements such as snubbers, there may be a requirement not only to display the current movement behavior of the component to be supported, e.g. a pipeline, but also to indicate the basic movement pattern or behavior of the supported component. In many of the above-mentioned applications, a conventional electronic position indicator is technically difficult to realize or the technical effort required for electronic monitoring or position indication is cost-intensive, for example, in nuclear plants due to semiconductor-damaging radiation and/or in other plants due to the need for explosion protection.

JP S57 14803 relates to a position-indicating device for a support device for indicating the movement of a portion of a support element relative to a fixed portion of the support element. This position-indicating device has a pointer indicator fixed to the fixed portion of the support element and having a pivotable pointer, wherein a dog disposed on a movable portion of the support element engages the pointer and entrains the pointer from its current position when the two portions of the support element move relative to each other. The product data sheet "Spring balance Macro Line 8005" of the company Pesola® concerns a spring balance, in which a hollow cylindrical part, which is fixed when the balance is in use and is provided with a handle, receives a cylindrical part, which is movable in relation thereto and is attached to the fixed part of the balance by means of a mechanical spring. The fixed, hollow-cylindrical part has a longitudinal slot through which a pointer screw extending radially outwardly on the movable part is arranged, which pointer screw extends radially through the slot of the cylindrical sleeve and, in the event of a relative displacement of the fixed and movable parts of the balance with respect to one another, entrains a drag pointer arranged outside the cylindrical sleeve for permanent indication of a weight attached to the movable part of the spring balance even after the weight has been removed.

SUMMARY

The present invention is based on the object of improving the functionality of conventional position-indicating devices for indicating the position of a movable portion of a support element and furthermore to reduce the size of the device.

The present invention achieves this object with a position-indicating. The position-indicating device comprises a mechanical movement-transmitting device, which can be attached to the support element on the input side, for transmitting the movement of the movable portion of the support element, an indicating device for indicating the movement of the movable portion of the support element, wherein the movement-transmitting device is coupled to the indicator device (20) on the output side and the indicating device has a hollow cylinder and a driver, which is movably mounted in the hollow cylinder and is movement-coupled to the movement-transmitting device, and wherein the hollow cylinder includes a longitudinal slot in which a radially outwardly extending transverse bolt extends which is moved along with the driver and which is designed to displace at least one extreme-value indicator or a portion thereof arranged radially outside with respect to the hollow cylinder, in particular axially.

The invention is based on the basic idea of providing a position-indicating device for a support element such as spring or constant hanger, a snubber or a vibration damper, in particular for the specified critical fields of application, wherein the position-indicating device according to the invention in addition to the indication of a current position, i.e. an instantaneous position, of the movable portion of the support element can further be designed to indicate at least one extreme-value position which has been assumed by the movable portion of the support element in the past period of time or which is currently being assumed. Such an extreme-value indicator can, for example, represent an amplitude value indicator in the case of support elements whose movable portion executes a movement as a result of an external excitation, the instantaneous excursion from a rest position in this case being described as elongation. Expediently, it can be provided that the position-indication device according to the invention is designed in such a way that the indication value of the extreme-value indicator is changed when a current position extends beyond a past extreme value. It can be provided that the radially outwardly extending transverse bolt has, on the one hand, a driver function with respect to the extreme-value indicator and, on the other hand, is designed to indicate an instantaneous position of the movable portion of the support element. However, it may also be provided that the driver moved inside the hollow cylinder is designed to indicate an instantaneous position of the movable portion of the support element. Depending on the embodiment, the transverse bolt can be rod-like, for example, in particular cylindrical or also angular in section perpendicular to its longitudinal extent.

The fact that the position-indicating device according to the invention can preferably be designed with purely mechanical components, in particular without electronic components, makes it particularly suitable for the critical application areas described above, wherein the movement-transmitting device can be designed in an application-related manner with respect to its overall length, for example in order to provide a position or travel indication outside a critical application area described above, in particular avoiding electronic components in order to avoid a risk of explosion and/or to increase the reliability, in particular within nuclear facilities.

Further features and further developments of the position-indicating device according to the invention are described in the following general description, in the Figures, in the description of the Figures and in the subclaims.

Expediently, it may be provided that the transverse bolt is fixed to the driver, in particular rigidly fixed to the driver. For example, the driver can be attached transversely to the direction of movement of the driver, in particular extending through it.

In order to provide for an introduction of forces as symmetrical as possible from the driver to the extreme-value indicator arranged radially outwardly of the hollow cylinder, it is expedient to provide that the hollow cylinder has a further longitudinal slot. This further longitudinal slot can be arranged radially opposite the first longitudinal slot, and the driver can have a radial extension such that it extends radially outwardly through both longitudinal slots, and both radial end portions of the driver can be designed to abut against the said extreme-value indicator and to move it, in particular, in the axial direction, i.e. in the direction of movement of the driver, in particular, in order to avoid canting in the mechanics of the position-indicating device according to the invention.

For the coupling of the movement-transmitting device to the indicating device, the former can be designed for attachment to the movable portion of the support element. In another embodiment, it may also be provided that the movement-transmitting device is designed to be attachable to the fixed portion of the support element, particularly in such embodiments in which the indicating device is attached to and moved with the movable portion of the support element.

In a simple embodiment, it may be envisaged that the movement-transmitting device is arranged to transmit a translation movement picked up on the input side into a translation movement on the output side. On the input side, the movement-transmitting device can be attached to the movable or fixed portion of the support element and on the output side to the indicating device. Depending on the embodiment, the movement-transmitting device may be designed to transmit a translation movement picked up on the input side one-to-one in an output-side translation movement. However, it is also within the scope of the invention to design the movement-transmitting device to provide a different transmission ratio, in particular a different conversion or translation. For example, in a one-to-two conversion, an input-side translation movement can be converted into twice the (distance) value of a translation movement. It can also be provided to design the movement-transmitting device in such a way that a translation movement picked up on the input side is converted into a rotational movement on the output side of the movement-transmitting device.

In particular in applications, in which the moving portion of a support element is indicated via the position-indicating device according to the invention and the movement presents a to-and-fro movement, it can be expediently provided that the movement-transmitting device comprises a machine element designed to transmit tensile and compressive forces, in particular a Bowden cable transmitting tensile and compressive forces. Preferably, such a Bowden cable can comprise a wire core, in particular a steel wire core, transmitting tensile and compressive forces.

The extreme-value indicator, which is arranged radially outside with respect to the hollow cylinder and supported to be axially displaceable with respect to the same, can comprise a first ring element which surrounds the hollow cylinder in such a way that the hollow cylinder extends through the ring element, wherein the ring element can be arranged in an axially displaceable manner with respect to the hollow cylinder. It may be provided that the ring element and the driver are arranged in such a way that the driver moves the ring element which is axially movable on the hollow cylinder, depending on the axial position inside the hollow cylinder. In order to enable a respective extreme-value indication in both directions during a reciprocating movement of the movable portion of the support element, it can be expediently provided that the extreme-value indicator has at least a second ring element which surrounds the hollow cylinder, in particular like the first ring element, and is arranged so as to be axially displaceable with respect to the hollow cylinder independently of the first ring element.

For an axial reception, at least in sections, of the transverse bolt in the at least one ring element, it can be expediently provided that the at least one ring element has an axial recess on an end face facing the driver for receiving the transverse bolt at least in sections in the axial direction, in particular for fixing a zero position of the extreme-value indicator. In a similar manner, it can be provided that both the first and the second ring element have an axial recess on an end face facing the driver for receiving the transverse bolt at least in sections in the axial direction, in particular in such a way that an operating position can be set in which the ring elements can be arranged in a predetermined operating position on associated end faces, in particular moved into contact with one another, for setting a zero or starting position of the first and/or the second ring element as parts of the extreme-value indicator of the position-indicating device according to the invention.

For driving or advancing the first and/or the second ring element axially to the hollow cylinder, it can be provided that the bottom of the axial recess of the first and/or the second ring element provides an axial stop surface for the transverse bolt. This stop surface can be formed as a contact surface for the transverse bolt of the driver in order to move the respective ring element into a position dependent on the driver for indicating a new extreme value.

To support the respective ring element on the hollow cylinder, the first and/or the second ring element can have a plain bearing element on a respective radially inner side, in particular in order to keep friction between the ring element and an outer lateral surface of the hollow cylinder low for easy displaceability of the respective ring element on the hollow cylinder. Expediently, it can be provided that the ring element provides a contact surface in the form of a cylinder jacket which bears against a contact surface in the form of a cylinder jacket of the hollow cylinder. However, it is within the scope of the invention to provide other matching associated surfaces, in particular associated angular contact surfaces, of the ring element and hollow cylinder. In order to avoid canting of the respective ring element during axial displacement relative to the hollow cylinder, it can be expediently provided that the first and/or the second ring element has at least two axially spaced plain bearing elements on a respective radially inner side. It can be provided that at least one of the at least two axially spaced plain bearing elements may have a dirt wiping functionality for maintaining a predetermined low coefficient of friction between the respective ring element and the hollow cylinder over the entire operating time of the device.

In order to protect the at least one ring element arranged radially outside with respect to the hollow cylinder or the extreme-value indicator against external influences, for example dirt, and to maintain their functionality, it can be expediently provided that the hollow cylinder with the driver accommodated therein and the extreme-value indicator are arranged in a transparent cylinder. In this respect, this transparent cylinder, which acts as a protective tube, can be arranged radially on the outside of the said components and accommodate them. For example, the protective tube can be made of transparent plastic or also of a glass material.

In principle, the outer lateral surface of the driver can be geometrically adapted to the inner lateral surface of the hollow cylinder for optimization, in particular in the manner of a clearance fit, in order to ensure easy displaceability of the driver in the hollow cylinder. Expediently, the driver can be designed with a cylinder-like outer lateral surface, which can have a fastening element for fastening the driver to the movement-transmitting device on an end face facing the movement-transmitting device, wherein the transverse bolt can be arranged on the end face facing away from the movement-transmitting device. For example, the fastening element can be designed as a clamping screw extending transversely or radially in order to fasten the movement-transmitting device, for example a Bowden cable, to the end of the driver. According to the invention, other fastening methods can also be used to fasten the movement-transmitting device to the driver, for example welding, soldering or gluing. It should be noted that hollow cylinders, ring elements and/or transparent cylinders do not have to have a circular cross section in all embodiments. Instead, angular or otherwise curved cross sections are also possible within the scope of the invention.

It may be provided to terminate the hollow cylinder and/or the protective tube at one or both end faces by means of end plates. The hollow tube may be designed in such a way that it merges into a support portion on one of its end faces for fastening the position indicating device according to the invention to a structural element. For example, this support portion can be a threaded pin or a threaded pin portion, via which the position-indicating device can be fastened to a structural part by means of a nut.

For the introduction of the movement-transmitting device into the interior of the hollow cylinder for attachment to the driver it can be expediently provided that one end face of the hollow tube an end plate provided with a through bore is arranged, which closes off the hollow space of the hollow cylinder on the end face, wherein in the installed position the movement-transmitting device, in particular a Bowden cable, can extend through the trough hole.

Expediently, it can be provided that the transparent cylinder and the protective tube are each closed off on the end face, in particular by means of one or more cover plates already described or the support portion, so that a substantially closed cavity is formed, within which the hollow cylinder, the driver received axially movable inside the hollow cylinder and the extreme-value indicator, which is arranged radially on the outside of the hollow cylinder and is axially displaceable, in particular in the form of a first and/or a second ring element, can be arranged.

Expediently, a safety element can be arranged on the end face of the hollow cylinder and/or of the transparent cylinder for indicating the execution of an opening process on the position indicating device according to the invention. This safety element can be, for example, a safety ring provided with two mounting bores, through both mounting bores of which a sealed wire can be guided to make visible any unauthorized opening of the position indicating device according to the invention.

To provide a zero point indication, a corresponding indicator can be attached, e.g. as a sticker, to the protective tube or the transparent cylinder, in particular to the outer lateral surface of the transparent cylinder.

BRIEF DESCRIPTION OF THE DRAWINGS

The invention will be explained in the following by describing one embodiment together with variations with reference to the accompanying Figures, wherein.

DETAILED DESCRIPTION

Figure 1:
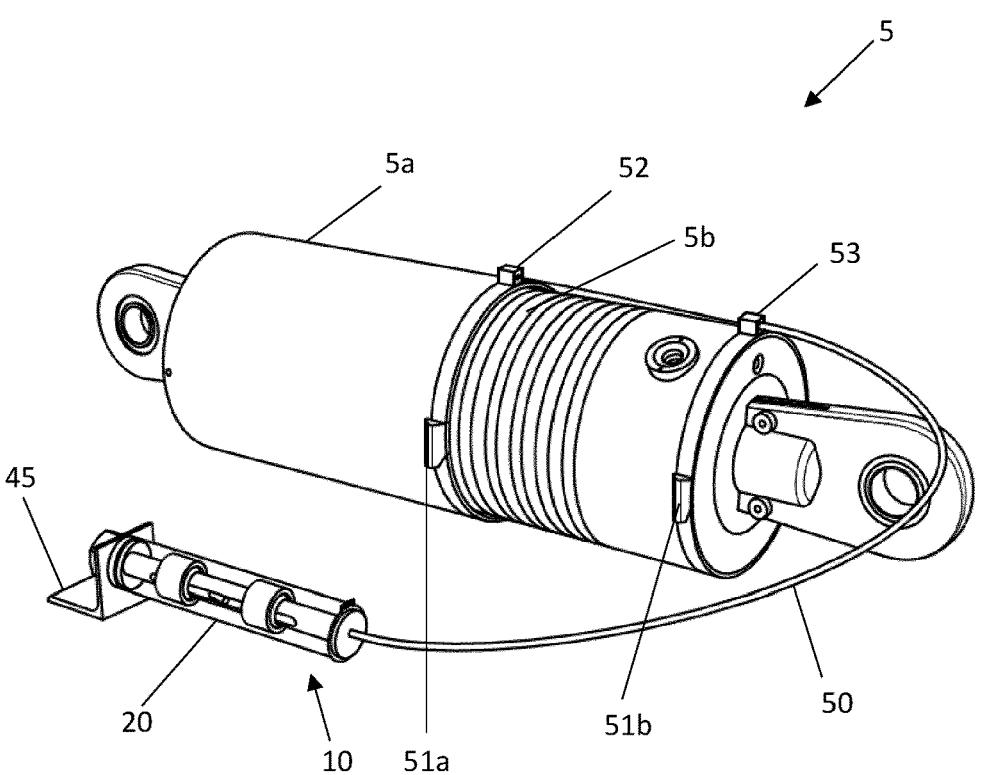
FIG. 1 shows a position indicating device designed according to the invention for use with a remotely arranged snubber.

FIG. 1 shows the position indicating device 10 according to the invention, which is designed to indicate the movement of a movable portion of a support element designed as a snubber 5 in this case. Such a snubber 5 is used, for example, in plant systems in order to immediately establish an almost rigid connection between the structural part to be secured, for example a pipeline and the surrounding structure, in the event of a malfunction, in order to absorb any impact-like kinetic energy and dissipate it without damage to the pipeline. However, the snubber must not be able to prevent temperature-induced displacements in particular. For this reason, they are designed in such a way that the thermal displacement during regular operation of the system remains free of any significant resistance due to the special mode of operation of the snubber. Known, for example, are hydraulic surge brakes, the function of which is controlled by a main control valve axially arranged in a hydraulic piston. When the piston moves slowly, for example due to thermal displacement, the valve is held open by spring force, and hydraulic fluid can flow unhindered from one cylinder chamber to another. When the piston moves fast above a limiting speed, for example due to an impact-like movement of the movable portion of the snubber caused by an earthquake, an occurring back pressure at the valve disc causes the valve to close, so that the hydraulic flow is interrupted and the movement is stopped. A hydraulically acting snubber of this type is described, for example, in the laid open publication EP 0 342 405 A1.

In the snubber 5 shown in FIG. 1, the portion designated by reference sign 5a is arranged displaceable relative to the longitudinal axis with respect to the fixed portion 5a, wherein in an exemplary application for securing a pipeline, one of the two portions is connected to the pipeline and the other portion is connected to a support structure via its respective fastening lug. In operation of the snubber 5 of FIG. 1, in the described embodiment, the outer sleeve of the movable portion 5a moves coaxially with the cylinder portion 5b fixed in this case.

To indicate the relative position of the two portions 5a, b of the snubber 5 which are movable with respect to one another, a position indicating device 10 designed according to the invention is provided which has an indicating device 20 which is movement-coupled to the movable portion 5a of the snubber 5 via a Bowden cable 50 having a wire core by means of a clamping connection to the movable portion 5a of the snubber 5. For this purpose, in the described embodiment, a fastening element, for example a hose clamp 51a, can be mounted non-positively around the sleeve of the movable portion 5a, wherein a clamping element 52 is arranged on the fastening element, to which clamping element the core of the Bowden cable 50 is clamped, so that the Bowden cable is movement-coupled to the movable portion 5a. In the described embodiment, the sheathing of the Bowden cable 50 can run over a guide element 53 which is attached to the portion 5b of the snubber 5 which is fixed in this case. For this purpose, in turn, a hose clamp 51b can be provided which is attached non-positively to the here cylindrical outer jacket of the fixed portion 5b of the snubber 5b. In the event of a relative movement of the movable portion 5a to the fixed portion 5b of the snubber 5, the longitudinal extension of the Bowden cable between the clamping element 52 and the guide element 53 changes, which is indicated by the movement coupling between the movement-transmitting device or Bowden cable and a driver on the indicating device 20.

Figure 2:
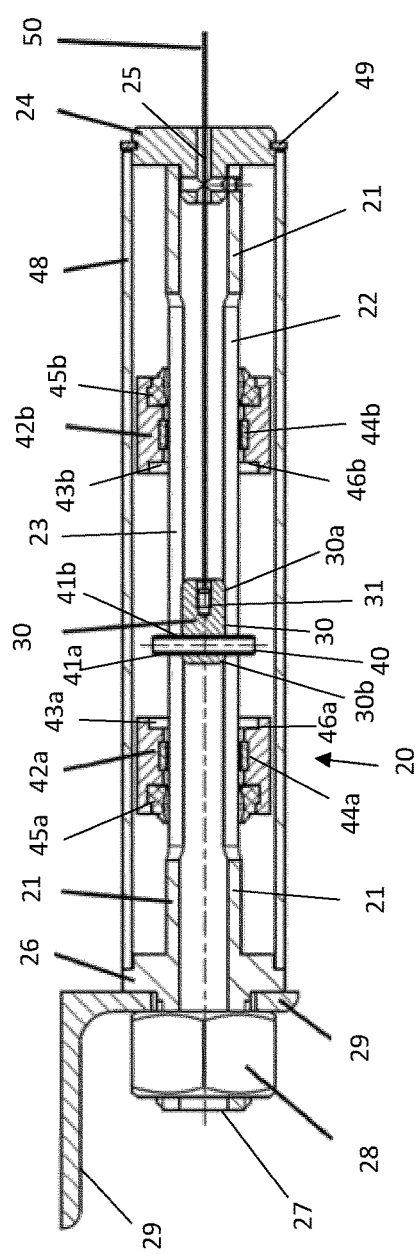
FIG. 2 shows the position indicating device shown in FIG. 1 in a longitudinal sectional view.

For this purpose, the indicating device coupled to the Bowden cable 50 can be designed according to the invention, which will be discussed in the following with reference to the illustrations in FIGS. 2 to 4. FIG. 2 shows the indicating device 20 of FIG. 1 with the Bowden cable 50 coupled to it in a longitudinal sectional view. In the embodiment described, the indicating device 20 comprises a hollow cylinder 21, which can be circular or cylinder-shaped both on the inner lateral surface and on the outside lateral surface. The hollow cylinder extends essentially over the entire longitudinal extent of the indicating device 20. A cylindrical driver 30 is arranged inside the hollow cylinder 21, the outer diameter of which is adapted to the inner diameter of the hollow cylinder 21 in such a way that the driver 30 is arranged so as to be axially displaceable within the hollow cylinder, for example within the scope of a clearance fit. The driver 30 has a longitudinal portion 30a facing the Bowden cable 50, in which the core of the Bowden cable 50 extending into the interior of the hollow cylinder 21 can be clamped, for example by means of a radially extending grub screw not shown in the drawings.

On the longitudinal portion 30b of the driver 30 opposite to the first-mentioned longitudinal portion 30a, in the described embodiment, the driver 30 can comprise a transverse bolt 40 that extends through a radial passage through the driver 30 on both sides and is taken along by the driver 30 during the movement conveyed by means of the core of the Bowden cable 50.

Whereas in the described embodiment the hollow cylinder 21 is closed at its end face facing the Bowden cable by means of an end plate 24, which has a bore 25 for the Bowden cable 50 to pass through, the hollow cylinder 21 can have a further end plate on its opposite end face, which end plate is manufactured separately from the hollow cylinder or, as in the described embodiment, an end plate 26 which is integrally formed with the hollow cylinder 21. As can be seen, for example, from FIG. 2, in the described embodiment, this integral end plate 26 can merge into a threaded pin 27 that is used for fastening the indicator by means of a fastening nut 28 and an associated fastening or flange element 29.

Furthermore, as can be seen for instance from FIG. 2, the indicator 20 further comprises two ring elements 42a, b that are arranged on both longitudinal sides of the driver 30 and are displaceable on the outer lateral surface of the hollow cylinder 21, said ring elements 42a, b being arranged as an extreme-value indicator inside the indicating device 20 in a manner yet to be described.

For the interaction of the driver 30 with the two ring elements 42a, b, each of which is arranged on one longitudinal side, these elements each provide a stop surface 46a, b on their end faces facing the driver in the installed position which in the embodiment described represents a bottom surface of an axial recess 43a, b. Depending on the excursion of the driver 30, these stop surfaces 46a, b cooperate with associated stop surfaces or axial surfaces 41a, b of the driver 30 to displace the ring elements 42a, b indicating the position extreme values. The axial extension of the recesses 43a, b are adapted to the axial extension of the transverse bolt 40 in such a way that when the two ring elements 42a, b approach each other until the mutually facing end face make contact, the transverse bolt 40 is completely accommodated in the two recesses 43a, b, which form a cavity in the said operating state, as will be discussed again below.

In order to protect the entire indicating device 20 of the position-indicating device 10 according to the invention against external influences such as dust and, moreover, against attempts of manipulation it can be provided in the position-indicating device according to the invention to arrange a transparent hollow cylinder or protective cylinder, in this case a glass cylinder 48, which radially accommodates the hollow cylinder with the driver arranged therein and the transverse bolts projecting radially therefrom as well as the ring elements 42a and 42b arranged radially to the hollow cylinder 30 and displaceably relative thereto. In this case, the end plates 24, 26 can provide contact surfaces for the glass cylinder 48 so that there is a substantially closed cavity within which the described indicator elements are movably arranged, which are arranged so as to be movable by the Bowden cable 50 directly (driver) or indirectly via said driver (ring elements).

Figure 3:
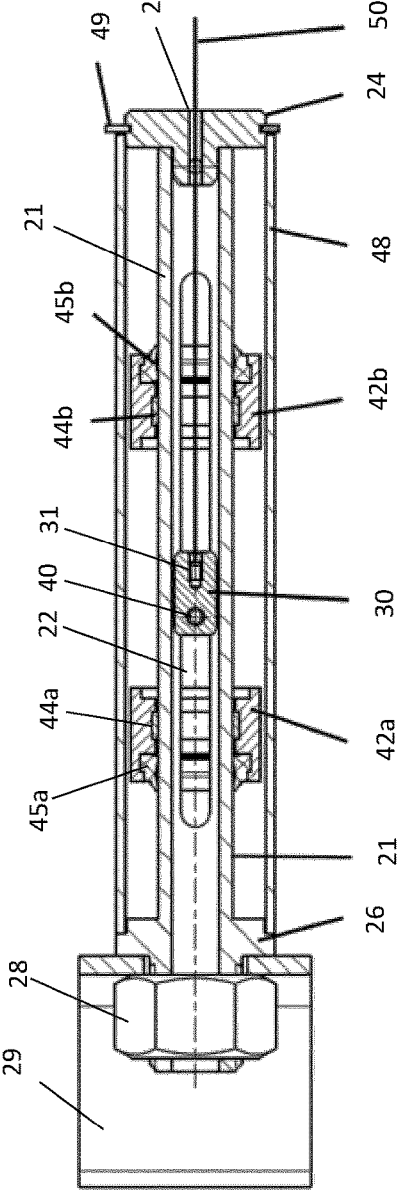
FIG. 3 shows the position indicating device shown in FIG. 1 in a longitudinal sectional view rotated by 90° relative to the view shown in FIG. 2.

FIG. 3 shows the indicating device 20 shown in FIG. 2 rotated by 90° to the axis of the hollow cylinder 21 in such a way that the rod-like transverse bolt 40 runs perpendicular to the drawing plane, wherein the representation provides a complete view of the longitudinal slot 23 that is arranged radially opposite the concealed longitudinal slot 22, see FIG. 2. It can be seen that in the described embodiment, the transverse bolt is circular in cross section, but it can also have a different shape, in particular a more angular shape.

To secure the display device 20, in the described embodiment, a circlip 49 can be arranged and inserted in a radial groove formed in the end plate 24 in such a way that circlip blocks the pulling-off of the glass cylinder 48 in the axial direction. Manipulation of the indicator can be prevented, for example, by passing a locking wire through the mounting holes of the locking ring, which are not shown in the Figures, and sealing it.

To prevent canting of the ring elements 42a, b on the outer lateral surface of the hollow cylinder, provision can be made to provide annular plain bearing elements 44a, 45 and 44b, 45b, respectively, which are formed and axially spaced apart from one another for contact with the outer lateral surface of the hollow cylinder. In this case, at least one of the two plain bearing elements 45a, b can be designed as dirt wiper in order to wipe off or avoid possible deposits on the outer lateral surface of the hollow cylinder 21.

Figure 4:
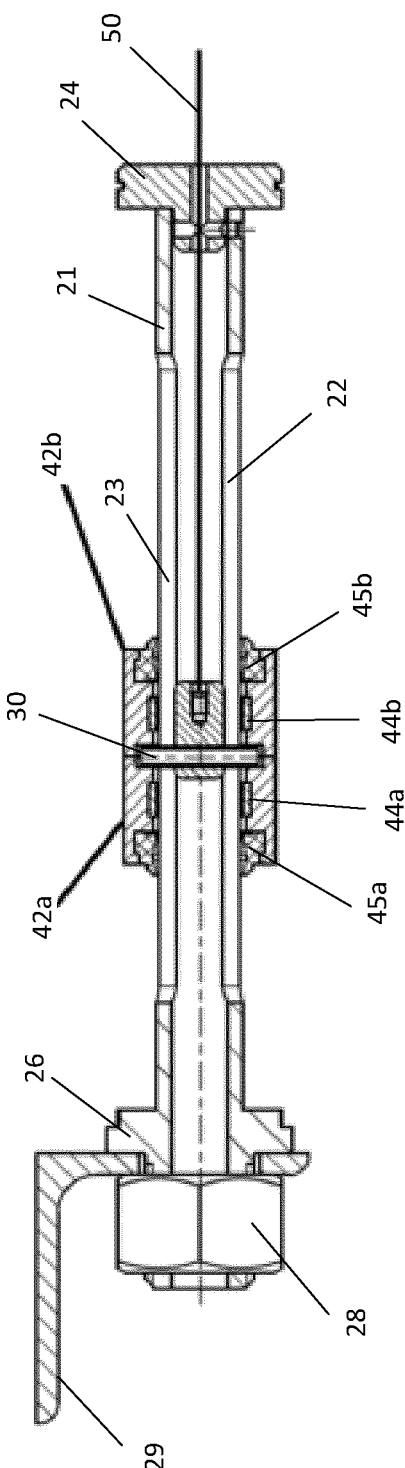
FIG. 4 shows the sectional view of FIG. 3 without the protective tube with the ring elements shifted for contact and to indicate a zero position.

FIG. 4 illustrates a situation in which the position-indicating device according to the invention is set or set to zero, assuming that the position of the movable portion of the support element, in this case the snubber 5, is in the rest position. In this case, by removing the circlip 49 and pulling off the protective tube 48, the driver was fixed in such a way that, by appropriately attaching the Bowden cable to the movable portion 5a of the snubber, see FIG. 1, the driver 30 or the transverse bolt 40 is in a position of the indicating device 20 which corresponds to the current position of the snubber. With reference to the illustration of FIG. 2, the two ring elements 42a, b are then moved towards the driver 30 until they contact each other at the end face, whereby the transverse bolt 40 is completely accommodated by the axial recesses 43*a, b*. The mutual position of the driver 30 and the ring elements 42*a, b* indicating extreme values of the driver movement, illustrated in FIG. 4, thus represents an initial or zero position in which the support element, in this case the snubber, is in a mounting position. Thereafter, the protective tube 48 can be mounted again and securing can be carried out by clamping the circlip 49. To mark this zero position, an appropriate marking can be applied to the transparent protective tube 48, for example by gluing. Similarly, a scale can be applied to the protective tube for reading off the instantaneous position and/or the extreme value positions. After carrying out the described adjustment, the position-indicating device according to the invention is ready for use.

Figure 5:
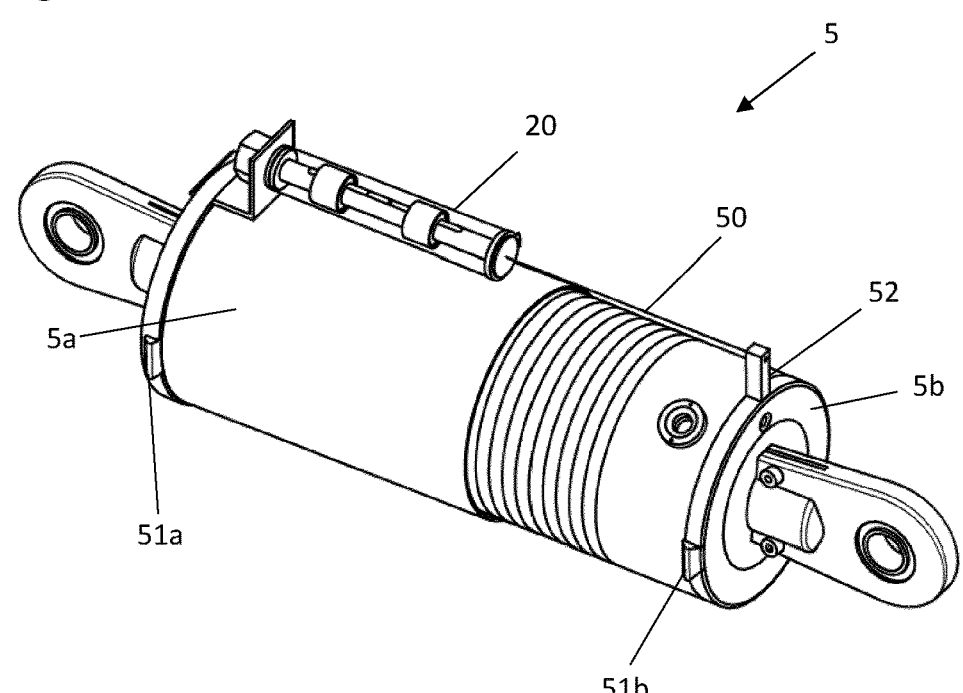
FIG. 5 shows a further application of the position indicating device with a snubber as shown in Figure.

FIG. 5 shows a further example of use in which, in contrast to the embodiment of FIG. 1, the position-indicating device is not arranged at a distance from the identically constructed snubber, but directly on the snubber, wherein the position-indicating device can be fastened either to the movable portion or to the fixed portion of the snubber, while the end-side clamping of the core of the Bowden cable takes place on the respective other portion of the snubber 5 for the described position indication on the indicating device 20 of the position-indicating device.

LIST OF REFERENCE SIGNS

10 position-indicating device
5 snubber
5*a* movable portion
5*b* fixed portion
indicating device
21 hollow cylinder
22 longitudinal slot
23 longitudinal slot
24 end plate
25 bore
26 end plate
27 threaded pin
28 fastening nut
29 flange element, fastening element
30 driver
30*a* longitudinal portion
30*b* longitudinal portion
31 clamping bore
40 transverse bolt
41*a, b* stop surface
42*a, b* ring element
43*a, b* axial recess
44*a, b* annular plain bearing element
45*a, b* annular plain bearing element
46*a, b* bottom, stop surface
48 glass cylinder, protective tube
49 circlip
50 Bowden cable
51*a, b* hose clamp
52 clamping element
53 guide element

What is claimed is:

1. A position-indicating device for indicating the movement of a portion of a support element which is movable relative to a fixed portion, comprising:
a mechanical movement-transmitting device, which can be attached to the support element on an input side, for the transmission of the movement of the movable portion of the support element;

an indicating device for indicating the movement of the movable portion of the support element, wherein the movement-transmitting device is coupled to the indicating device on an output side and the indicating device has a hollow cylinder and a driver which is movably mounted in the hollow cylinder and is movement-coupled to the movement-transmitting device, and wherein the hollow cylinder comprises a longitudinal slot in which a radially outwardly extending transverse bolt extends which is moved along with the driver and which is designed to displace at least one extreme-value indicator arranged radially outside with respect to the hollow cylinder.

2. The position-indicating device according to claim 1, wherein the transverse bolt is rigidly fastened to the driver.

3. The position-indicating device according to claim 1, wherein the hollow cylinder has a further longitudinal slot that is arranged radially opposite to the first longitudinal slot, wherein the transverse bolt radially extends through both longitudinal slots.

4. The position-indicating device according to claim 1, wherein the movement-transmitting device is designed for fastening to the movable portion of the support element.

5. The position-indicating device according to claim 1, wherein the movement-transmitting device is arranged to transmit a translation movement picked up at the input side into an output-side translation movement.

6. The position-indicating device according to claim 1, wherein the movement-transmitting device comprises a machine element designed for transmitting tensile and compressive forces.

7. The position-indicating device according to claim 1, wherein the extreme-value indicator comprises at least one ring element which surrounds the hollow cylinder and is arranged so as to be axially displaceable with respect to the latter.

8. The position-indicating device according to claim 7, wherein the extreme-value indicator comprises at least one second ring element which surrounds the hollow cylinder and is arranged so as to be axially displaceable with respect to the hollow cylinder independently of the first ring element.

9. The position-indicating device according to claim 7, wherein a first and/or a second ring element has an axial recess on an end face facing the driver for receiving the transverse bolt at least in sections in the axial direction.

10. The position-indicating device according to claim 9, wherein bottom of the axial recess of the first and/or the second ring element provides an axial stop surface for the transverse bolt.

11. The position-indicating device according to claim 7, wherein a first and/or a second ring element comprises a plain bearing element on a radially inner side in order to support the ring element against the hollow cylinder.

12. The position-indicating device according to claim 11, wherein the first and/or the second ring element comprises at least two axially space plain bearing elements on a radially inner side, wherein at least one of the at least two axially spaced plain bearing elements is configured as a dirt wiper to wipe off or avoid deposits on an outer surface of the hollow cylinder.

13. The position-indicating device according to claim 1, wherein the hollow cylinder with the driver accommodated therein and the extreme-value indicator are arranged in a transparent protective tube.

14. The position-indicating device according to claim 1, wherein the driver is configured with a cylinder-like outer surface having a fastening element on an end face facing the movement-transmitting device for fastening to the move-ment-transmitting device, wherein the transverse bolt is arranged on an end face facing away from the movement-transmitting device.

15. The position-indicating device according to claim 1, wherein the hollow tube merges on one end face into a support portion for fastening the position-indicating device to a structural element.

16. The position-indicating device according to claim 1, wherein on one end face of the hollow tube an end plate provided with a through bore is arranged, which end plate closes the cavity of the hollow cylinder on the end face, wherein the movement-transmitting device extends through the through bore in the installed position.

17. The position-indicating device according to claim 13, wherein the protective tube rests against an end face of a support portion and a cover plate and together with these forms a cavity.

18. A support device for movably supporting a structural element such as a pipeline against a fixed bearing position further comprising a position-indicating device according to claim 1.

19. Use of a position-indicating device according to claim 1 for indicating the movement of a movable portion of a support element relative to a fixed portion, the support element being at least one of a spring, a constant hanger, a snubber, a vibration damper or an articulated strut.

20. The position-indicating device according to claim 6, wherein the machine element designed for transmitting tensile and compressive forces is a Bowden cable.

* * * * *